(12) United States Patent
Aune et al.

(10) Patent No.: US 12,372,680 B2
(45) Date of Patent: Jul. 29, 2025

(54) SYSTEM AND METHOD FOR ACQUIRING MARINE SEISMIC DATA USING A VIBRATOR

(71) Applicant: Reflection Marine Norge AS, Laksevag (NO)

(72) Inventors: Håkon Aune, Oslo (NO); Thomas Elboth, Oslo (NO); Kambiz Iranpour, Oslo (NO); Arash Jafargandomi, Tunbridge Wells (GB); Robert Montgomery Laws, Cambridge (GB); Tore Andre Nilsen, Nesbru (NO)

(73) Assignee: Reflection Marine Norge AS, Laksevåg (NO)

( * ) Notice: Subject to any disclaimer, the term of this patent is extended or adjusted under 35 U.S.C. 154(b) by 362 days.

(21) Appl. No.: 17/875,662

(22) Filed: Jul. 28, 2022

(65) Prior Publication Data
US 2023/0034759 A1 Feb. 2, 2023

Related U.S. Application Data

(60) Provisional application No. 63/227,636, filed on Jul. 30, 2021.

(51) Int. Cl.
G01V 1/38 (2006.01)
(52) U.S. Cl.
CPC ......... *G01V 1/3808* (2013.01); *G01V 1/3835* (2013.01); *G01V 1/3861* (2013.01)
(58) Field of Classification Search
CPC ... G01V 1/3808; G01V 1/3835; G01V 1/3861
See application file for complete search history.

(56) References Cited

U.S. PATENT DOCUMENTS

| | | | |
|---|---|---|---|
| 10,288,753 B2 | 5/2019 | Poole et al. | |
| 10,571,589 B2* | 2/2020 | Beitz | G01V 1/38 |
| 2013/0155805 A1* | 6/2013 | Tonchia | G01V 1/3826 367/16 |
| 2013/0286773 A1 | 10/2013 | Haumonte | |
| 2013/0343153 A1 | 12/2013 | Laws | |
| 2016/0297508 A1* | 10/2016 | Renaud | G05D 1/0692 |
| 2016/0299245 A1* | 10/2016 | Renaud | G01V 1/3808 |
| 2017/0371070 A1* | 12/2017 | Teyssandier | G01V 13/00 |
| 2020/0333485 A1 | 10/2020 | Hegna et al. | |

OTHER PUBLICATIONS

International Search Report and Written Opinion issued in Application Serial No. PCT/NO2022/050184 on Nov. 18, 2022.

* cited by examiner

*Primary Examiner* — Krystine E Breier
(74) *Attorney, Agent, or Firm* — Mark H. Whittenberger; Holland & Knight LLP (57) ABSTRACT

Described herein is a method for acquiring data using a marine vibrator towed by a vessel, the method comprising: obtaining data comprising at least one nominal pre-plot position in a horizontal plane; monitoring a position of the marine vibrator in the and a speed of the vessel; determining an offset between the position of the marine vibrator and the nominal pre-plot position in the towing direction; based on the offset and the vessel speed, adjusting one or more survey parameters and driving the vibrator with a series of one or more sweeps so that a predetermined frequency in the sweep or a subsequent sweep is emitted when the position of the vibrator is within a maximum distance of the nominal pre-plot position.

10 Claims, 3 Drawing Sheets

FIG. 2B

SYSTEM AND METHOD FOR ACQUIRING MARINE SEISMIC DATA USING A VIBRATOR

CROSS-REFERENCE TO RELATED APPLICATIONS

This application claims the benefit of U.S. Provisional Patent Application No. 63/227,636, filed on Jul. 30, 2021, the entire content of which is herein incorporated by reference.

FIELD OF THE INVENTION

The present invention relates to systems and methods for acquiring marine seismic data using a vibrator, and particularly to system and methods for acquiring 4D compatible seismic data with a vibrator.

BACKGROUND

In oil and gas exploration and development, marine seismic surveys are an important tool in terms of making drilling related decisions. Seismic data acquired during such a survey is processed to generate a profile (i.e., an image), which is a three-dimensional approximation of the geophysical structure under the seafloor. This profile enables those trained in the field to evaluate the presence or absence of oil and/or gas reservoirs, which leads to better management of reservoir exploitation. Improving marine seismic data acquisition and processing is an ongoing process.

BRIEF DESCRIPTION OF THE DRAWINGS

Embodiments of the present invention will now be described, by way of example only, with reference to the following diagrams wherein.

DETAILED DESCRIPTION

Figure 1:
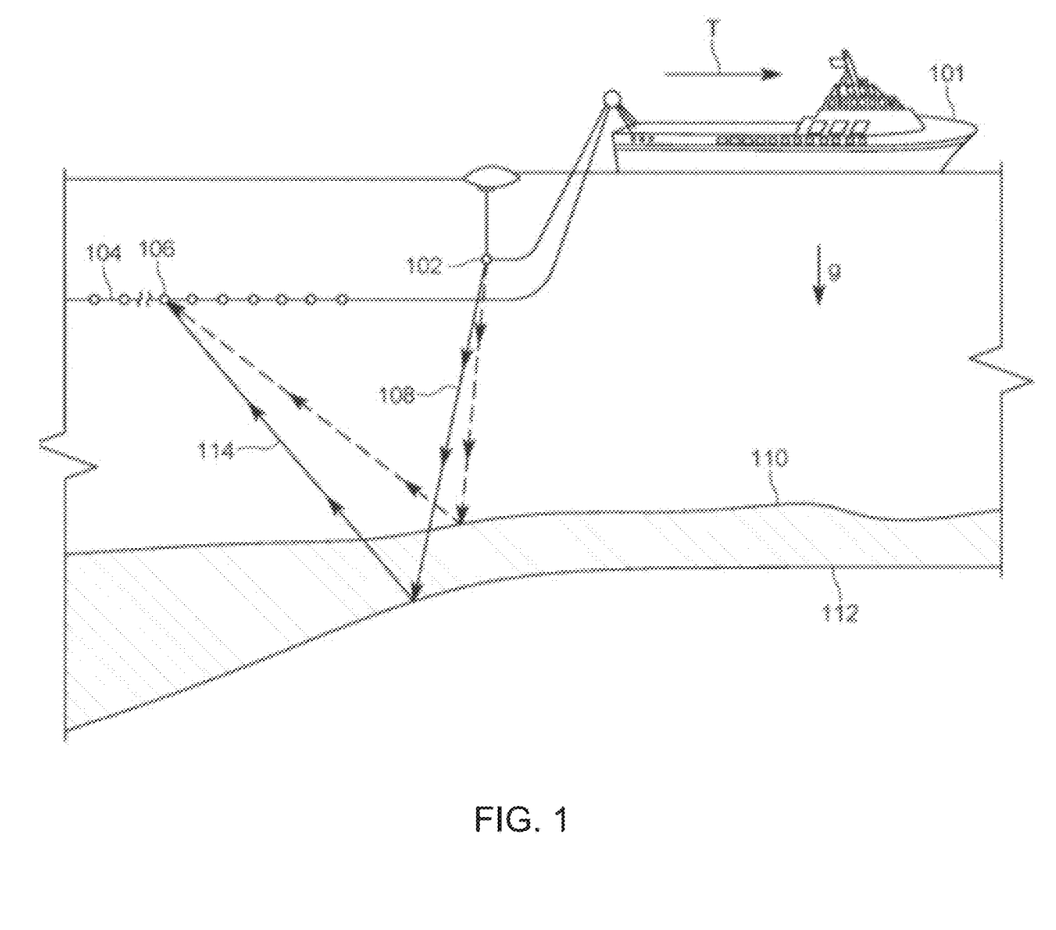
FIG. 1 illustrates a possible survey configuration.

An example configuration for a marine seismic survey with a towed streamer is shown in FIG. 1. This figure illustrates a vertical-plane view of one possible marine survey setup 100, which can be used with the methods described below. A vessel 101 tows a seismic source 102 (note that, for simplicity, the source's full configuration is not shown) and zero or more streamers (only one streamer 104 is visible in this view) are pulled by the vessel in the inline towing direction. When the seismic source is activated, seismic/acoustic energy 108 is emitted into the water and propagates into the rock formation under the seafloor 110. This seismic energy is partially reflected and partially transmitted at interfaces where the acoustic impedance changes, such as at the seafloor 110 and at an interface 112 inside the rock formation. Reflected energy 114 may be detected by sensors or receivers 106. The term sensor, as used herein, is understood to mean a physical device that records seismic data, and a receiver is understood to mean a unit that includes one or more sensors for which the signals measured by the one or more sensors are combined and represent the signal of the receiver. These receivers are carried by the streamers or are located on the sea floor within nodes or cables. A sensor may be a hydrophone, geophone, DAS fiber and/or accelerometer. The acquired or recorded seismic dataset represents the detected energy.

Marine surveys typically comprise a vessel towing one or more seismic sources and possibly one or more streamers towed by the same or a different vessel in the towing (inline) direction.

In marine seismic acquisition, airgun sources are commonly used. Airguns work by releasing high-pressure air to generate an acoustic pulse (Parkes and Hatton; 1986). Technically this works well, however there is a concern regarding the possible environmental effect that the use of airguns might have on parts of the marine fauna. This concern is attracting interest from regulators and has already resulted in legislation that controls, limits, or in some cases completely excludes, the use of airgun sources in some areas. It is anticipated that further regulations will be introduced in the future.

Compared to airguns, vibrators are perceived as being less environmentally intrusive sources. This is mainly because they emit their signal as a low and near-continuous hum instead of a spike. Both the peak amplitude and, in most cases, the overall energy emitted is significantly reduced compared with that of an airgun source. Even with the same energy output, a continuous signal is probably less injurious than an impulse one (Southall et al. 2007).

Vibrators also have some interesting geophysical benefits that have sparked new interest in this technology (see Laws et al. 2019 for details). Especially interesting is the ability to accurately control the phase and amplitude of the emitted signal. Some applications that take advantage of these features are described in the patents U.S. Pat. No. 9,618,636B2, AU2015261675B2, U.S. Pat. Nos. 10,928,535B2, 9,547,097B2.

When carrying out a seismic survey, it is normally a requirement for the survey to be 4D compatible. 4D compatible refers to the fact that the survey is acquired in such a way that it can form a baseline for a future repeat survey (forward compatibility) or can be used as a repeat/monitor of an existing vintage survey in the same area (backward compatibility). 4D surveys are used to monitor/repeat or look for changes in the subsurface resulting from human activity. Typically, 4D signals are used to understand how the oil or gas moves in a reservoir due to production activities, or to monitor the long-term stability of, for example, $CO_2$ at a subsurface storage site.

In order to detect a normally weak 4D signal, one needs to repeat the source (and receiver positions), as well as the output of the source, throughout the survey area. To facilitate this, surveys are normally acquired on a nominal pre-plot grid, meaning that the seismic vessel aims to activate the source(s) at pre-defined nominal positions in space. This is achieved by having an inline shot/sweep point interval (SPI) corresponding to a predetermined distance, usually measured in meters, between each source activation. We refer to the distance between the nominal preplot position (aimpoint) and the actual position where a source was initiated as an offset.

The positioning accuracy requirements relating to the source (and receiver) positions in a repeated survey depend on the incidence angle and the wavelength of the incoming signal. The geophysical theory is explained by Monk D; 2010. In order to get a good 4D signal, it is more important to match the source (and receiver) positions for a high frequency signal than for a low frequency signal. In typical airgun surveys where all frequencies are emitted from the same point, this translates into a requirement that source (and receiver) positions should typically be repeated to within an rms-accuracy of a few meters. Mismatches or errors of more than 5-10 m in the horizontal plane are typically seen as unacceptable. For vibrators, the situation is a bit different. For a low frequency vibrator operating in the 3-20 Hz range, the requirement on positioning accuracy of the source positions is typically in the order of tens of meters. At the other, high frequency, end of the seismic spectrum, the positioning accuracy requirements are much tighter, typically the same as that of an airgun source.

As an example, using the well-known formula $\lambda = C_w/f$, where $C_w = 1500$ m/s is the speed of sound in water, $\lambda$ is the wavelength and f is frequency, at 10 Hz and 75 Hz an acoustic wave traveling through water has a wavelength of 150 m and 20 m, respectively. To get a good 4D signal in the presence of noise it is typically necessary to match the phase of these sinusoids to within a given percentage of this wavelength. Typically, this might be within 10 to 20%. At a zero-degree incidence angle the phase will be most sensitive to mismatch in the vertical (z) direction. Such errors will introduce a phase error in the signal. However, most marine seismic data is recorded at an offset, where the horizontal mismatch also becomes important. This is not straightforward to compensate for, and in practice one has to interpolate/extrapolate the missing data.

Geophysically, the subsurface tends to absorb high frequencies quicker than low frequencies. In a typical seismic bandwidth of 3-250 Hz or higher, the seismic energy above around 100 Hz can normally only be used to image the first few hundred milliseconds of the subsurface. In the North Sea, reservoirs typically sit at around 2 sec two-way traveltime (TWT). At this level, there is normally little usable energy above 50-80 Hz. In sub-salt reservoirs in the Gulf of Mexico (GoM), the highest usable frequencies can be as low as 15-20 Hz. The highest usable frequency of interest in a given target area can be identified from the seismic data.

Figure 2A:
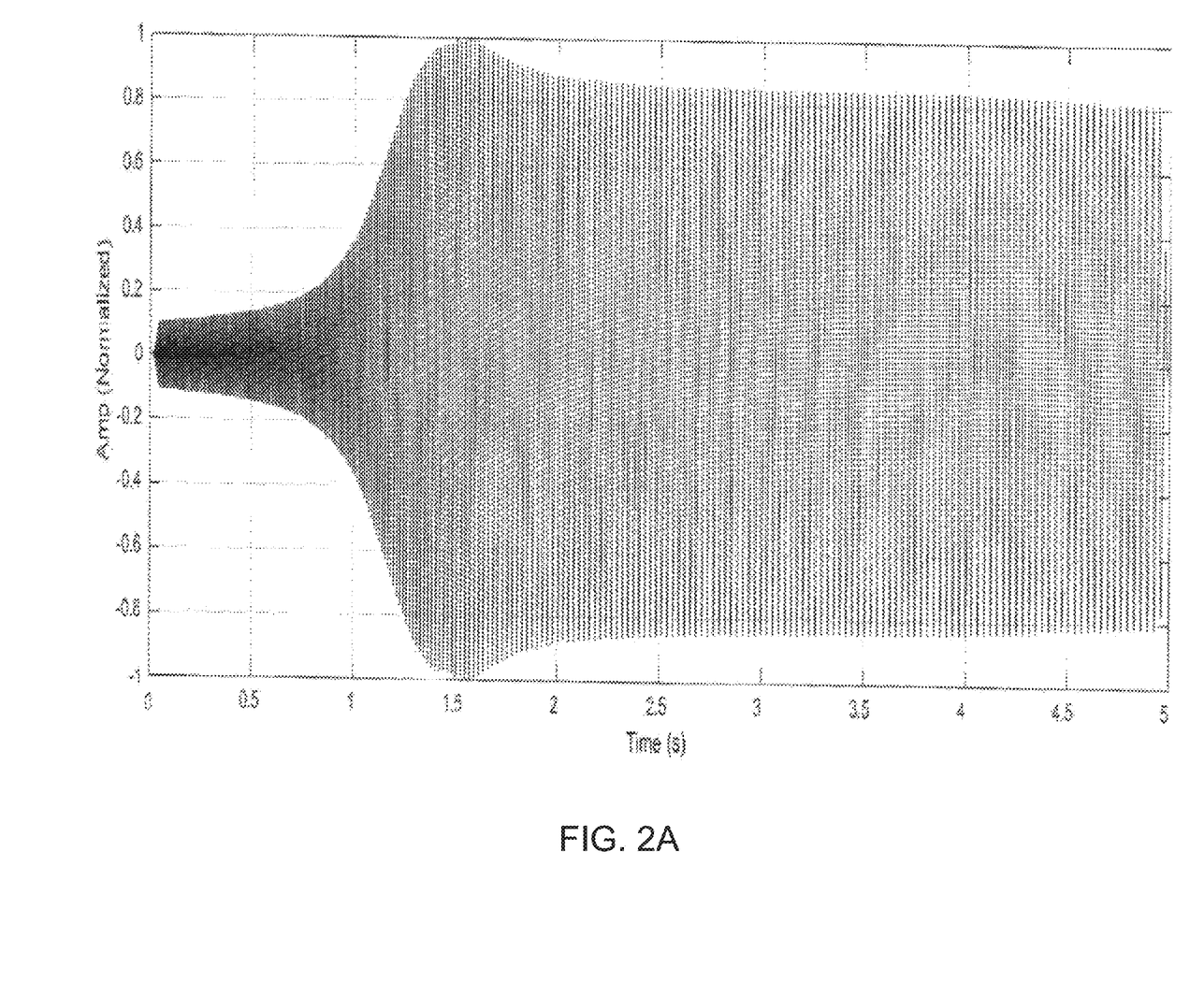
FIG. 2A shows a normalized 5 second notional source seismic sweep shown in the time-domain.
Figure 2B:
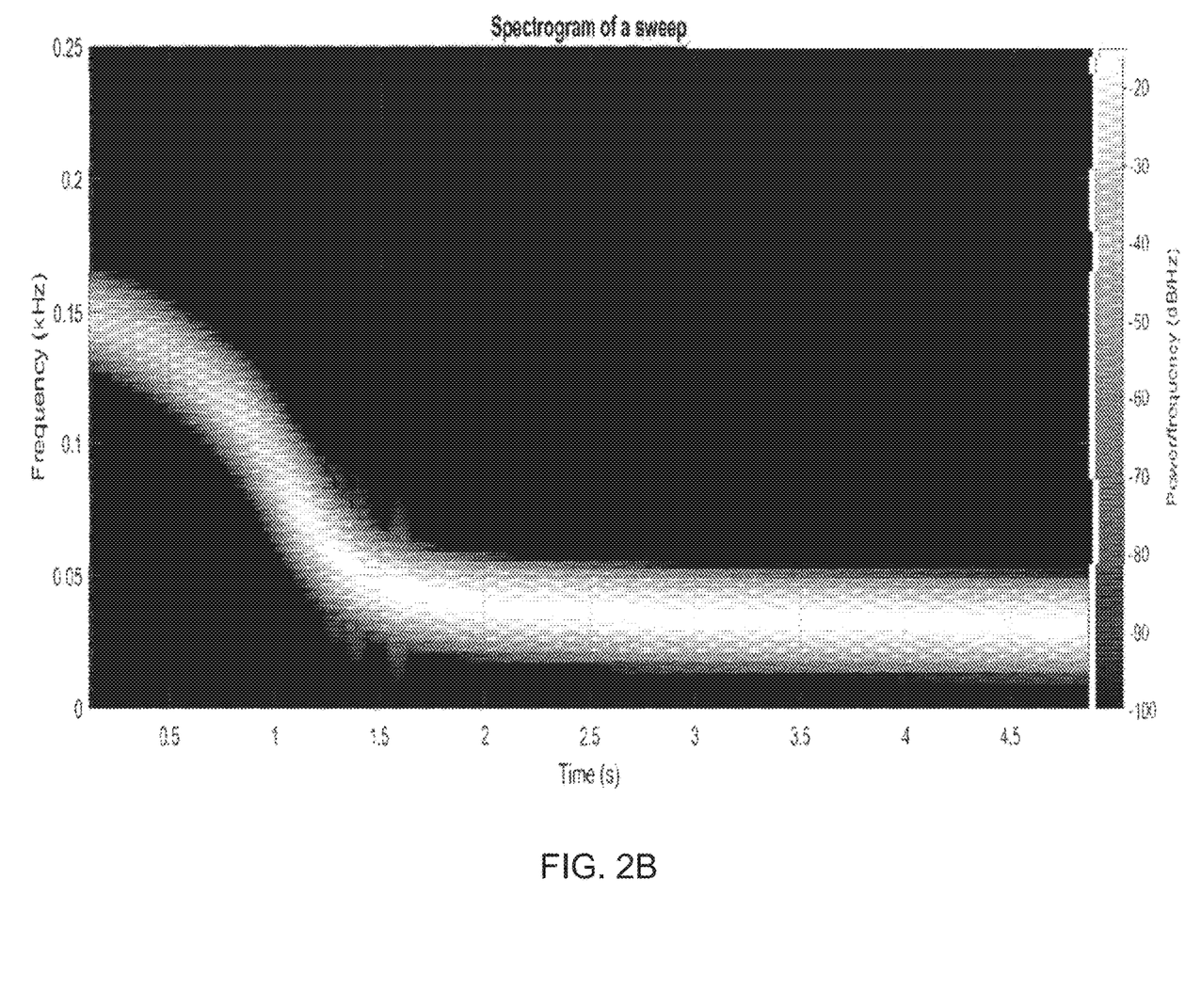
FIG. 2B shows the spectrogram of the sweep shown in FIG. 2A.

FIG. 2A shows a typical example of a 5 second vibrator sweep going from ~30 to 150 Hz, while FIG. 2B shows its spectrogram. In this case we have an upsweep (going from lower to higher frequencies). It is also possible to construct a down-sweep, which means that we go from higher to lower frequencies in a sweep. Following both the Fresnel-zone argument of Monk D 2010 and the fact that high frequencies are absorbed more quickly than low frequencies, a high frequency sweep should ideally be short and should be repeated often. A low frequency sweep, in contrast, can be longer and does not need to be repeated so often.

When we refer herein to a vibrator or a vibrator source, this can mean a single vibrator unit or an array of vibrators working together. When two or more vibrators operate together, they normally have a common aimpoint, which is the normally defined as the geometrical center.

A vibrator sweep is normally part of a sweep sequence. In such a sequence, a vibrator will emit consecutive sweeps that are similar or identical in terms of duration and emitted energy. Within the sweep sequence, however, the phase of the individual sweeps might be varied. As explained in Laws et al. 2019, such variations are of value since they can, among other things, enable efficient residual shot/sweep noise attenuation or deblending. Reference to residual shot/sweep noise attenuation is to the ability to remove the noise signal from the previous shot/sweep (shot number N-1). Deblending refers to separating signals that are overlapping in both time and frequency.

In order for the residual shot/sweep noise attenuation and/or deblending to be effective, consecutive sweeps should ideally have the same length. The only way to achieve this is to sweep on time, however this is not 4D friendly since variations in the vessel speed will it make it difficult to follow a pre-plot given in spatial coordinates. This is why seismic surveys are normally acquired on a preplot (they are shot based on spatial positions). In a marine seismic survey, sources are normally towed behind a vessel with a speed of around 5 knots, which roughly corresponds to ~2.5 m/s. At this speed, the example source in FIG. 1 will move around 5 s×2.5 m/s=12.5 m during each sweep. This means that the high-frequency end and the low-frequency end of the example sweep is spatially separated by around 12.5 m. Consequently, it is impossible to match the source position of an airgun sweep for all frequencies when using a vibrator as the source. As such, there is a need for new technology that can help make vibrator surveys 4D compatible, both as a baseline survey and as a repeat/monitor survey. A particularly challenging problem is how to make a repeat vibrator survey compatible with a vintage air-gun survey.

According to a first aspect of the present invention, there is provided a method for acquiring marine seismic data using a vibrator towed by a vessel on a pre-plot grid comprising a nominal pre-plot position, the method comprising: monitoring a position of the marine vibrator and the speed of the vessel; determining an offset between the position of the marine vibrator and its nominal pre-plot position in the inline direction; based on said offset and the vessel speed, adjusting one or more survey parameters and driving the vibrator with sweeps so that a predetermined frequency is emitted when the position of the vibrator is within a maximum distance of the nominal pre-plot position.

The subsequent sweep will usually refer to the sweep directly following (in time) the sweep at issue, but may be a sweep later in the sweep sequence. The offset may be measured in a direction along the tow direction, i.e. in the direction of movement of the vessel and the vibrator or the inline direction. For a baseline survey comprising a plurality of nominal pre-plot positions, the offset will relate to the next pre-plot position in the inline direction and will be the pre-plot position through which the vibrator will pass next.

In embodiments, the data comprises a plurality of nominal pre-plot positions spaced at regular shot/sweep point intervals, and determining the offset comprises determining an offset between the position of the marine vibrator and the next nominal pre-plot position in the inline direction.

In embodiments, the maximum distance is less than 5 meters, and preferably less than 3 meters, or less than 2 meters. Preferably, the maximum distance is negligible, substantially zero, or zero.

In embodiments, adjusting one or more survey parameters comprises adjusting the length of the sweep. In embodiments, the predetermined frequency is the starting frequency for a subsequent sweep. The next sweep will therefore begin when the vibrator is coincident with the nominal pre-plot position (or within a specified distance of this position). The length of the subsequent sweep can be set so that, at the current vessel speed, the time taken for the vessel to travel one SPI is equal to the sweep length.

In embodiments, the sweep comprises an active portion, during which a signal is emitted, followed by a silent portion, during which no signal is emitted. The silent portion therefore represents "white space" or a time period where the vibrator is inactive. The silent portion may always be applied at the end of the sweep, with the active portion at the start, or vice versa. More than one silent period can be included, and these may be applied at different stages during the sweep. Usually, the active part of the sweep will not be interrupted, but this may not always be the case.

In embodiments, adjusting the length of the sweep comprises adjusting the length of the silent portion. Only the length of the silent portion may be adjusted, and the active portion may remain the same length (potentially with the same frequency components) for each sweep. The active portion may be identical for the different sweeps in the sequence. The length of the active portion and an initial length for the silent portion may each be set at the start of the survey based on an initial speed of the vessel and a SPI (distance between adjacent nominal pre-plot positions in the baseline survey in a towing direction). The combined length of the active portion and the silent portion may be initially set so that the vessel travels one SPI in one sweep length. The adjustment to the length of the sweep (such as by adjusting the length of the silent portion) may be carried out every $N^{th}$ sweep, where N>1, if the start of the sweeps is beginning to drift from the nominal pre-plot positions.

In embodiments, the predetermined frequency is the starting frequency for a subsequent sweep, and the method comprises adjusting the speed of the vessel, based on a current speed of the vessel and the determined offset, so that the subsequent sweep is initiated when the vibrator is at the nominal pre-plot position.

In embodiments, adjusting the length of the sweep comprises truncating the sweep or extending the sweep to higher or lower frequencies. The sweep may comprise the same set of frequencies, but may be cut-short before the end of the predetermined sequence. For an up sweep or a down sweep, therefore, the highest or the lowest frequencies (those to be emitted last) may be discarded. Of course, any part or parts of the frequency range making up the sweep can be discarded in order to truncate the sweep, if desired.

In embodiments, adjusting the length of the sweep comprises stretching or contracting at least part of an active portion of the sweep. Stretching or contracting refers to extending or reducing the time within which a set number of periods of the waveform are emitted. This will result in a stretching or contracting of the waveform which will mean that the overall length of the sweep will change.

In embodiments, the method comprises adjusting the amplitude of at least part of the sweep based on the adjusted length of the sweep such that the energy emitted is substantially the same for each sweep. The energy emitted may be controlled by adjusting the amplitude so that it is equal to a fixed value for the sweep, and for every subsequent sweep. For a sweep with a shorter active portion, this will mean increasing the amplitude to compensate, and for a sweep with a longer active portion, this will mean decreasing the amplitude for the sweep. The amplitude of all or only a select part of the sweep can be adjusted. Only the amplitude of a range including the highest frequency of interest may be adjusted in some cases.

In embodiments, the method comprises adjusting the amplitude so that it is inversely proportional to the length of the sweep. In embodiments, the vibrator emits the highest frequency of interest at or close to the nominal pre-plot position. In embodiments, the predetermined frequency is a frequency within the range of frequencies that the vibrator can emit, which is either equal to or is closest to the highest frequency of interest. The highest frequency of interest refers to the highest frequency of reflected seismic signal that is received from a predetermined reservoir depth/target area. This can be determined from the power spectrum of the seismic signal for any particular region. In embodiments, the method comprises, based the speed of the vessel and the offset, initiating the sweep before the vibrator reaches the nominal pre-plot position so that the predetermined frequency, which may be the highest frequency of interest, is emitted when the vibrator is at the nominal pre-plot position.

In embodiments, the method comprises initiating the sweep as an up sweep at the predetermined frequency and continuing the sweep to a maximum frequency, or initiating the sweep as a down sweep at the predetermined frequency and continuing the sweep to a minimum frequency.

In embodiments, the method comprises terminating an active portion of the sweep at the maximum or minimum frequency. This way, if a down sweep is used initially no frequencies above the highest frequency of interest are emitted, which can be beneficial since it maximizes the signal-to-noise by emitting more energy in the frequency range of most interest.

In embodiments, once the maximum or minimum frequency is reached, the method comprises sweeping in the opposite direction from the highest frequency of interest to fill in the remaining portion of the sweep.

In embodiments, once the minimum frequency is reached, the method comprises emitting an up sweep starting at the highest frequency of interest and ending at a maximum frequency. This way the whole frequency range can still be covered, whilst ensuring that the best match for a baseline airgun survey is achieved.

In embodiments, the method comprises driving the vibrator with a sequence of sweeps, wherein the steps of determining and adjusting are carried for every Nth sweep in the sequence, and N is more than or equal to 2. This ensures that the length of the sweep is not changed for every sweep, which can be important for residual shot/sweep noise attenuation and deblending. In embodiments, the method comprises identifying a highest frequency of interest with respect to a 4D signal in existing marine seismic data, and applying the highest frequency of interest as the predetermined frequency.

According to a second aspect of the present invention, there is provided a method for acquiring marine seismic data with a vibrator towed by a vessel, the method comprising: obtaining data comprising a plurality of nominal and regularly spaced pre-plot positions; monitoring the speed of the vessel and a position of the vibrator; based on the speed of the vessel, setting an initial sweep, comprising an active sweep period and zero or more silent portions, wherein the total length of the sweep is equal to the time taken for the vibrator to travel from one nominal pre-plot position to the next nominal pre-plot position; driving the vibrator with the initial sweep parameters; at the start of every $N^{th}$ sweep, where N is equal to or greater than one, determining an offset between the actual vibrator position the nominal pre-plot position in the inline direction; if the offset is above a threshold distance, adjusting the length of the sweep so that the subsequent sweep is started within a predetermined distance of its nominal pre-plot position. The offset may be between the actual vibrator position and the next nominal pre-plot position in the online direction.

In embodiments, N is equal to or greater than 2. N may be greater than or equal to 5, greater than or equal to 10, or greater than or equal to 30.

In embodiments, the length of the one or more silent portions is between 0 ms and 2000 ms, preferably between 0 ms and 1000 ms.

In embodiments, adjusting the length of the sweep comprises adjusting the length of the silent portion.

In embodiments, adjusting the length of the sweep comprises adjusting the length of the active portion. To adjust the overall sweep length, either only the silent portion of the adjusted sweeps can be changed, only the active portions of the adjusted sweeps can be changed, or both the active and silent portions can be adjusted (either for each sweep where the sweep length is changed or with a different type of adjustment being applied to each adapted sweep).

In embodiments, the method comprises adjusting the amplitude of the sweep such that the energy emitted at each sweep is substantially the same.

According to a third aspect of the present invention, there is provided a method for acquiring a vibrator monitor survey on an air-gun survey baseline, the method comprising: identifying a highest frequency of interest with respect to a 4D signal in existing marine seismic data; and designing a vibrator sweep based on a speed of the vessel towing the vibrator so that the highest frequency of interest is emitted at the time when the vibrator source passes over a nominal source point position of the baseline survey.

In embodiments, the method comprises applying a time shift to the start of the sweep to ensure the highest frequency of interest is emitted at the nominal pre-plot position.

In embodiments, the sweep starts at the nominal pre-plot position.

In embodiments, the designed sweep does not include frequencies above the highest frequency of interest.

According to a fourth aspect of the present invention, there is provided a non-transitory computer readable medium including computer executable instructions, wherein the instructions, when executed by a processor, cause the method of the above aspects to be performed.

In any of the examples described above, the phase of consecutive sweeps can be the same or phase can be varied between sweeps.

As mentioned above, vibrators offer good control of both phase and amplitude. Phase encoding can, for example, be used to attenuate residual shot/sweep noise and/or for deblending. However, for this to be possible consecutive vibrator sweeps either need to be identical in terms of length or be dithered.

The use of continuous sweeps is beneficial from an energy point of view, since it allows the maximum amount of energy to be output. However, in order for the survey to be 4D compatible, meaning that it can be repeated or can act as a repeat of an earlier survey, the sweeps also need to be actuated on a regular nominal spatial grid (i.e. to shoot on position and not on time).

In a real-life setting, these requirements (continuous and identical sweeps+shoot on pre-plot position) cannot be fully accommodated at the same time. The main reason for this is that the vessel speed over the ground continuously fluctuates due to variations in ocean currents, waves, and winds. These speed variations are normally small, and they change relatively slowly (in the order of tens of seconds or minutes). However, the combination of constant sweep length (in time) and a fluctuating vessel speed makes it impossible to consistently hit the nominal start-of-sweep position for each sweep. If the vessel is going just a bit too slow or too fast, the positioning error with respect to the nominal start-of-sweep positions on a regular grid will accumulate from sweep-to-sweep. This is unacceptable from a 4D perspective.

A solution to this problem is described herein, and this involves ensuring that a particular frequency in the active portion of the sweep is emitted as the vessel crosses the nominal pre-plot position, or when its position coincides with the nominal pre-plot position in an inline direction. This coordination should generally be carried out at least every few sweeps, but preferably not too often, as changing the sweep length will make it difficult to do deblending or residual shot noise attenuation. The source position is monitored and compared with the nominal positions on a pre-plot grid, and adjustments are made to ensure that when the source is coincident with the nominal position, a particular point in the active portion of the sweep has been reached, i.e. a particular frequency in the active portion of the sweep is being emitted.

This co-ordination of the pre-plot position with the sweep can be achieved by constructing a sweep sequence that is made up of one or more active sweeps and zero or more short silent periods, which may be in the order of 100 ms. A "silent period", as used herein, refers to a period where the source is not active, or where no signal is emitted by the source, between, before, or after the active sweeps. These silent periods will vary, but may each be in the order of 100 ms in length. The length of each of the silent periods (or the mean length of the silent periods for a number of consecutive sweeps) may be between 0 ms and 2000 ms in length, more preferably between 50 ms and 1000 ms in length, more preferably between 50 ms and 500 ms in length, and most preferably between 100 ms and 300 ms in length. The total length of an active sweep and one or more silent periods together can be set to be equal to the time it takes the vessel to move (at a predetermined speed) to its next sweep/shot point. The active sweeps may always have a constant length, and the silent periods are normally also kept at a constant length, enabling efficient residual shot noise attenuation/deblending.

At regular intervals, a check is performed to determine how far away the start of the next sweep is from its nominal pre-plot source position. If it is too far away, one or more sweep parameters, such as the length of the silent period(s) is adjusted, and/or the speed of the vessel is adjusted, to re-align the start of the next sweep or a subsequent sweep with its nominal pre-plot source position. Adjustment of the speed of a vessel may need to be carried out over a period of time, particularly for large vessels.

Each time such an adjustment is made, the ability to use the phase encoding in order to carry out residual shot/sweep noise attenuation for that particular sweep is lost. This is unfortunate, but can be acceptable provided that the adjustment is not required too often. In a typical survey, one may want to limit this adjustment to ensure that the non-attenuated residual shot noise only affects every 5th, 10th or even every 30th sweep. When the data is sorted away from common shot gathers, traces coming from these adjusted sweeps will stand out as intermittent and noisy. These noisy traces can be handled by any standard industry de-noising method.

As an illustrative example, one can assume a nominal vessel speed of 4.7 kn (equivalent to around 2.42 m/s), a minimum vessel speed of 4.6 kn (equivalent to around 2.37 m/s) a maximum speed 4.8 kn (equivalent to around 2.47 m/s), and a nominal shot/sweep-point-interval (SPI) for the vibrator of 12.5 m. At 4.7 kn, it takes 5.17 seconds to travel 12.5 m. An initial active sweep length of 5 seconds and a silent period of 0.17 seconds are therefore initially chosen, so that the combined length of the active sweep and subsequent silent period is 5.17 seconds.

Provided that the vessel speed can be maintained at 4.7 kn, this ensures that every sweep is started at the nominal pre-plot position. However, if the speed varies and the vessel is only traveling at 4.6 kn during a series of sweeps, each sweep will be ~25 cm short (i.e. the second sweep in the series will begin 25 cm ahead of the nominal pre-plot position). Unless the vessel speed is quickly adjusted, these errors will accumulate, and after around 10 sweeps the start of the next sweep will be ~2.5 m away from the nominal pre-plot position. At this point an alarm mechanism can be used to alert personnel of the error between the start-of-sweep position and the nominal pre-plot position. To adjust for this error, the length of the silent period after the active sweep can be adapted. In the above example assuming 4.6 kn vessel speed, the silent period can be enlarged in order to prevent further errors from accumulating.

In addition to this adjustment to the silent period, a single long silent period can be included in order to bring the start of the next sweep level with the nominal pre-plot position again. The silent period can also be made slightly longer than would be required to simply prevent further increase in the error, which will then start to bring the start-of-sweep positions closer to the nominal positions again with each subsequent sweep.

Rather than traveling below the nominal speed, it could be that the vessel is traveling faster than the nominal speed of 4.7 kn. If the vessel is traveling at the maximum speed of 4.8 kn, for example, this will also cause an error of ~25 cm per sweep to accumulate. This time, however, the start of the sweeps will be increasingly further ahead of the nominal positions. As for the situation where the vessel is traveling too slowly, an alarm may trigger once a threshold error is reached, and a re-computation of the length of the silent periods to be applied at the end of each active sweep can be carried out. If the vessel is traveling too fast, it could then make sense to overcompensate the new silent period to ensure that the correct pre-plot positions for the new sweeps are gradually approached. Instead, or at the same time, the vessel speed could also be gradually reduced. Alternatively, one could drop one or more sweeps, and bring the start-of-sweep position back to a position that is coincident with the nominal pre-plot position again.

The numbers used in the above examples are for the purpose of illustration only. The speed of the vessel, the shot/sweep interval (SPI), the active sweep lengths, the lengths of the silent periods, and the acceptance criteria for how far away from the nominal pre-plot position the actual position is allowed to diverge can each vary from survey to survey. Further, in a survey with multiple vibrators, the different numbers/requirements can also vary for the different vibrators in the survey. For example, vibrators operating in the low frequency (LF) bands can be set to have longer sweeps than vibrators operating in higher frequency (HF) bands. One may potentially want to have many vibrators, each operating in their own frequency band, with their own sweep length. The positional accuracy requirements for the individual vibrators might also depend on the frequency band they operate in.

Another solution to the problem of hitting the correct nominal pre-plot source positions, in a situation where continuous sweeps are used and the vessel speed is varied, is to provide a list of available sweeps which can be selected from, either at the start of each sweep or at another interval. All of the sweeps in the list can have the same frequency content, but the length of each sweep is different. For each pre-plot position a sweep can then be selected which has the appropriate length to match the time it will take the vessel, and thus the vibrator, to reach its next pre-plot position. To allow for efficient residual shot/sweep noise attenuation and/or deblending using phase encoding, limits can be set on how often the system can change the sweep length. After the sweep length has changed, the system can be prevented from changing the sweep length again for another whole number of sweeps (e.g. 2, 3, 5, 10 or 20 sweeps), for example. In an example, the sweep length could be allowed to change only every $5^{th}$ or every $10^{th}$ sweep. The analysis of the vessel speed and the selection of a sweep can also be carried out at the start (or end) of every sweep, every second sweep, or every third sweep, for example.

In this case, the sweeps each represent a period of time throughout which the source is active, and each sweep is activated directly following the end of the previous sweep (i.e. there is no silent period included). A benefit of this solution is that it ensures that sweeping is carried out 100% of the time. This maximizes the energy output for the vibrators. The energy output of each individual sweep may, however, vary slightly (this would essentially depend on the instant vessel speed). From a 4D point of view this is not ideal. The residual source noise (RSN) may also be deconvolved into a 'chirp' (short sweep) every time a different sweep is selected, instead of a spike. This could potentially cause some problems for the subsequent processing of the data.

In some cases, the amplitude of the sweeps can be adjusted inversely to the sweep length. The shorter sweeps will therefore have a slightly larger amplitude compared to the longer sweeps, ensuring that all sweeps emit the same total energy. The cost of this adaption is that the vibrators will operate a few percent below their maximum capacity most of the time.

Another possibility is to introduce non-linearities into the sweeps. This can be done by constructing the sweeps so that they all have an identical output (phase and amplitude) in a given frequency range. Outside of this frequency range the sweeps can be adjusted separately in order to fill in the remaining part of the frequency in the available time.

All sweeps may be identical, with a length based on the nominal vessel speed, and adjustment of the sweep length can be carried out as required. If the vessel is determined to be traveling too slowly, the sweep can be extended. On the other hand, if the vessel is traveling too fast, the sweep can be cut short or truncated. This is exemplified below, for a nominal up-sweep going from 3 to 20 Hz with a nominal sweep-length of 10 seconds (with a vessel speed of ~4.8 kn and a 25 m pre-plot grid size). If the vessel is going slower than 4.8 kn, the sweep can be extended upwards in frequency, meaning that it will continue to higher frequencies (above 20 Hz) at the end of the nominal sweep such that the sweep continues for longer than 10 seconds. If the vessel is going too fast, the sweep can be cut short after the vessel has traveled the nominal 25 m. As with the earlier examples, there can be a limitation introduced to require that the sweep-length cannot be changed at the start of every sweep.

The nominal sweep can in some cases be squeezed or extended so that its length corresponds to the time it will take the source to reach its next pre-plot position. Squeezing or extending refers to compressing or stretching the sweep so that the same number of cycles or periods fit into a shorter or longer time frame.

This will alter the frequency content of the individual sweeps, but only by a small amount. As with the earlier examples, a limitation can be set on how often the sweep length is allowed to change. A requirement that the sweep length cannot change at each sweep, or cannot change for two consecutive sweeps, can be introduced, for example. The sweeps can also be made to be non-linear, by for example only squeezing or extending certain parts of the sweep, whilst leaving other parts of the sweep unchanged.

This way the effect of the change can on the frequency can be limited to one, perhaps less useful, region of the spectrum.

An interesting advantage or side-effect, which applies to all the above approaches where the sweep-length is adapted, is that the adjustments will work to randomize (in time) the arrival of the residual shot/sweep noise and/or blending noise. This is advantageous in terms of processing when the noise is to be attenuated.

It should be understood that many of the above embodiments can be combined. For example, it is possible to combine non-linear sweeps with sweep squeezing, so that only certain parts of the sweep (some frequencies) are squeezed/extended.

In marine seismic acquisition, airguns have dominated the market since the late 1960s. As such, it is likely that there will be a future need to acquire a 4D monitor survey with vibrators on an existing airgun baseline survey. To do this, each vibrator sweep will need to be matched against an airgun pulse in the best way possible. This can be achieved in a survey including a plurality of vibrators operating in different frequency bands. As an example, one or more LF vibrators can be included in the survey, operating from 3-20 Hz, and one or more HF vibrators can be included, each operating in the range 20-150 Hz.

A source being towed at 5 kn will move around 25 m during a 10 second sweep. In comparison, an airgun pulse is nearly instant, having a main pulse of just a few milliseconds, and a much suppressed bubble that lasts a second or two. In practice this means that a vibrator sweep cannot match the spatial position of all frequencies in an airgun baseline shot (which are coincident in terms of position).

As mentioned above, the wavelength λ of a signal is given by the well-known formula $\lambda=C_w/f$, where $C_w$ is the speed of sound and f is the frequency of the signal. A high frequency signal (short wavelength) is therefore rather more sensitive to positioning inaccuracies as compared to a low frequency signal. Consequently, in a 4D setting it may be more important to match the positions of the higher frequencies (HF) than the lower frequencies (LF). Geophysically, HF signals are absorbed more quickly in the subsurface than LF signals. This means that at a typical O&G reservoir, sitting a few km below the surface, only frequencies up to an upper limit are present in the reflected data. It is typically at a known reservoir area/level that an O&G company will look for a 4D signal.

The highest frequency of interest in the target area can be determined, and then this particular frequency can be matched at the nominal source point position. The highest frequency of interest does not necessarily refer to the highest detectable frequency, but rather to the highest frequency with a meaningfully strong amplitude, i.e. the frequency that is typically most sensitive to 4D changes. This highest frequency of interest is a quantity that is relatively easy to determine from a seismic image. In practice, this can be achieved by selecting a narrow time window around the reservoir, computing a Fourier transform of the selected data and examining the power spectrum. By studying the slope of this spectrum, it is possible to determine the highest frequency of interest, which will correspond to the frequency associated with the highest power. This parameter can be established for a baseline survey taken in a particular location, and then used to design repeat surveys to be completed using the same nominal start-of-sweep positions.

In an example, 70-80 Hz is identified as the highest frequency of interest for the 4D survey. In this case, at the nominal position, the sweep is started at around 80Hz (the highest frequency of interest in this case) and then sweeps down to, for example, 20 Hz. If the highest frequency of interest is identified as 40-50 Hz. The sweep can be started as an up-sweep at 40 Hz, and can be swept up to 150 Hz, for example. The sweep can then jump to 40 Hz and sweep down to 20 Hz for the last part of the composite sweep. The emitted signal that has a higher frequency than the highest frequency of interest might still have some value in for example imaging the shallow part of the subsurface. The sweep therefore starts at the highest frequency of interest, and then sweeps up or down to a maximum or minimum frequency before filling in any missing frequency range in the sweep. This process can be applied for any identified highest frequency of interest, which may vary between surveys, by beginning the sweep at this frequency as described above.

In another embodiment, no signal at all is emitted above the highest frequency of interest for the reservoir. The sweep may be started at the highest frequency of interest and then swept downwards in frequency to the end of the sweep, for example. An added benefit of limiting the output frequencies is that it allows more energy to be emitted in the more interesting frequency bands, thereby increasing the signal-to-noise (SNR) in these regions.

The individual vibrator units in a survey comprising multiple vibrators may be set to emit different frequencies. For example, an LF vibrator may only operate in the 3-20 Hz range. 20 Hz might be well below the highest frequency of interest for a given reservoir target. In such a case, it is possible to select the highest frequency which that particular vibrator emits (whether this is 20 Hz or a different frequency) as the highest frequency of interest. For LF vibrators, the positioning inaccuracies relative to the wavelength are normally small, however, to get the best possible 4D match it would still make sense to start at the nominal pre-plot position with a down-sweep (i.e. matching 20 Hz to the pre-plot), and then sweep down to, for example, 3 Hz. This is because 20 Hz will be more sensitive than 3 Hz to positioning inaccuracies in terms of a 4D survey.

In another embodiment, a normal up or down sweep is used. At the same time, based on vessel velocity, a time-shift is computed which allows the sweep to be started a bit ahead of the nominal pre-plot position. The goal is to make sure that the sweep hits the highest frequency of interest at the nominal pre-plot position.

What is claimed is:

1. A method for acquiring marine seismic data with a vibrator towed by a vessel, the method comprising:
    obtaining data comprising a plurality of nominal and regularly spaced pre-plot positions;
    monitoring the speed of the vessel and a position of the vibrator;
    based on the speed of the vessel, setting an initial sweep, comprising an active sweep period and zero or more silent portions, wherein the total length of the sweep is equal to the time taken for the vibrator to travel from one nominal pre-plot position to the next nominal pre-plot position;
    driving the vibrator with the initial sweep parameters;
    at the start of every $N^{th}$ sweep, where N is equal to or greater than one, determining an offset between the actual vibrator position the nominal pre-plot position in the inline direction;
    if the offset is above a threshold distance, adjusting the length of the sweep so that the subsequent sweep is started within a predetermined distance of its nominal pre-plot position.

2. The method of claim 1, wherein N is equal to or greater than 2.

3. The method of claim 1, wherein the length of the silent portions is between 0 ms and 2000 ms.

4. The method of claim 3, wherein the length of the silent portions is between 0 ms and 1000 ms.

5. The method of claim 1, wherein adjusting the length of the sweep comprises adjusting the length of one or more of the one or more silent portions of the sweep.

6. The method of claim 1, wherein adjusting the length of the sweep comprises adjusting the length of the active portion of the sweep.

7. The method of claim 1, comprising adjusting the amplitude of the sweep such that the energy emitted at each sweep is substantially the same.

8. The method of claim 1, wherein the method is a method for acquiring 4D compatible seismic data.

9. A non-transitory computer readable medium including computer executable instructions, wherein the instructions, when executed by a processor, cause the following operations to be performed:

monitoring a position of the marine vibrator and the speed of the vessel;

determining an offset between the position of the marine vibrator and its nominal pre-plot position in the inline direction;

based on said offset and the vessel speed, adjusting one or more survey parameters and driving the vibrator with sweeps so that a predetermined frequency is emitted when the position of the vibrator is within a maximum distance of the nominal pre-plot position.

10. A non-transitory computer readable medium including computer executable instructions, wherein the instructions, when executed by a processor, cause the following operations to be performed:

obtaining data comprising a plurality of nominal and regularly spaced pre-plot positions;

monitoring the speed of the vessel and a position of the vibrator;

based on the speed of the vessel, setting an initial sweep, comprising an active sweep period and zero or more silent portions, wherein the total length of the sweep is equal to the time taken for the vibrator to travel from one nominal pre-plot position to the next nominal pre-plot position;

driving the vibrator with the initial sweep parameters;

at the start of every Nth sweep, where N is equal to or greater than one, determining an offset between the actual vibrator position the nominal pre-plot position in the inline direction;

if the offset is above a threshold distance, adjusting the length of the sweep so that the subsequent sweep is started within a predetermined distance of its nominal pre-plot position.

\* \* \* \* \*